Sept. 5, 1950 N. OHMAN ET AL 2,521,401
VARIABLE FREQUENCY VIBRATOR
Filed June 15, 1946

INVENTOR.
NILS OHMAN
HAROLD J. VERITCH
BY
Willis B. Rice

Patented Sept. 5, 1950

2,521,401

UNITED STATES PATENT OFFICE 2,521,401

VARIABLE FREQUENCY VIBRATOR

Nils Ohman, New York, and Harold J. Veritch, Brooklyn, N. Y., assignors to Interval Instruments, Inc., New York, N. Y., a corporation of New York Application June 15, 1946, Serial No. 676,968

4 Claims. (Cl. 172—245)

This invention relates to variable frequency vibrators.

Mechanical bodies have long been used as standards of frequency because of the accuracy with which the frequency may be maintained. Many such bodies have a very high Q, that is they require very little power to maintain them in vibration, and the frequency of response is a very sharp one, such that even a very slight change in the energizing frequency either above or below the critical frequency of the body will cause a very marked falling off in response by that body. It is this factor which has made mechanical vibrators of value as frequency indicators. At the same time, it is this same factor which normally limits such a frequency indicator to a single frequency.

Many proposals have been made to alter the natural frequency of such a mechanical body. For example, if such a body be a vibrating string, the period may be varied by varying the length or the tension or the weight. Or if it be a vibrating reed, it may be varied by varying the thickness or the length. Such adjustments, however, are made by external force to bring the device into harmony with the frequency.

It is an object of this invention to provide a device of the character described, which will respond to every frequency within a predetermined scale range, but in which each response will be characteristic of its own frequency so that of all the frequencies to which the device can respond, the particular frequency to which it is responding may be readily determined by inspection of that characteristic.

In accordance with this invention, therefore, there is provided a reed which has different natural frequencies in different angular positions around its axis. The frequency of vibration gradually increases as the plane of vibration rotates about the axis. Thus for any specific plane of vibration there is a definite sharply defined frequency so that the frequency of vibration may be determined by the angular position of the plane of vibration. This may readily be accomplished by flattening a portion of the reed adjacent to its base and twisting the flattened portion into a spiral so that the outer edges thereof form helices. Thus in any plane of vibration including the axis of the reed, the reed will be rigid except about an axis where the flattened cross section its transverse to the plane of vibration. About that axis point the resistance to bending will be so remarkably less than about any other axis that that axis will serve substantially as a hinge about which the reed will vibrate whenever the inciting force has a frequency corresponding to the frequency of the reed vibrating in that plane.

The invention accordingly comprises an article of manufacture possessing the features, properties and the relation of elements which will be exemplified in the article hereinafter described and the scope of the application of which will be indicated in the claims.

For a fuller understanding of the nature and objects of the invention, reference should be had to the following detailed description taken in connection with the accompanying drawing, in which.

Figure 1:
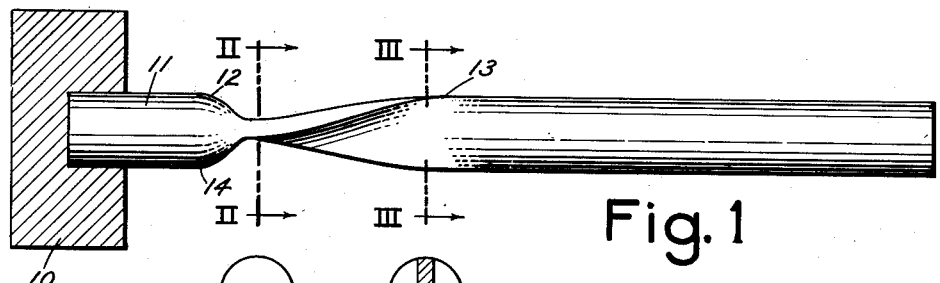
Figure 1 is a variable frequency reed made in accordance with this invention.
Figure 2:
Figures 2 and 3 are sections on the lines II—II and III—III in Figure 1.
Figure 3:

Within its broad scope therefore, the device of this invention comprises a reed capable of vibrating in a plurality of different planes about the axis, and having a different natural frequency of vibration in each plane, as for example if the reed has a different ratio between its weight its length and its elastic factors in different planes. Such a result will follow if the reed has a different moment of inertia of its cross section relative to the different planes, or if the reed be constricted to greatly decrease its cross-sectional moment of inertia in different planes at different given points in the length of reed. In such a manner there is provided what may be regarded as elastic hinges about which the remainder of the reed may vibrate, one of said hinges being spaced farther from the end than the other.

Such a construction provides a reed that has two or more separate and distinct natural periods of vibration, and once the instrument is calibrated one may immediately see what frequency the reed is in fact responding to, by noting the angularity of the plane of vibration.

In the preferred embodiment of the invention herein chosen for illustration, a vibrator having an infinite number of said pinched places or hinges merging into one another as a continuous surface is used.

In the drawings, the numeral 10 represents a base in which is rigidly mounted a reed 11, which for a portion of its length near the base, for example between the points 12 and 13, is flattened and twisted through an angle, for example through an angle of 90°. The remainder of the reed may be left in its natural contour. With this construction, every line through the flattened portion lying between the points 12 and 13 which is transverse to the axis of the reed is in a different plane and hence is at a different distance from the free end of the reed and hence corresponds to a different natural frequency of vibration. It is also at a different angle from every other such line, so it represents not only a characteristic frequency, but also a characteristic angle.

With such an instrument, if it be subjected to a gradually increasing frequency of excitation from any source symmetrically disposed about the axis, starting at a frequency below the lower limit of the device, the time will come when the reed will start vibrating about a section near the point 12 as a hinge, and when viewed as shown in Figure 1 will thus vibrate in the plane of the paper. As the frequency continues to rise, the hinge line will move to the right, toward the free end of the reed, finally reaching a section near the point 13. At such time, as illustrated, the reed will be vibrating in a plane transverse to the paper. At every intermediate frequency a definite intermediate angle will be used.

Thus by noting the angle of the plane of vibration of the reed, it is possible to read the frequency with considerable accuracy. When such an instrument is excited by an unknown frequency within its scope, the frequency of the excitation can be read at once.

Figure 4:
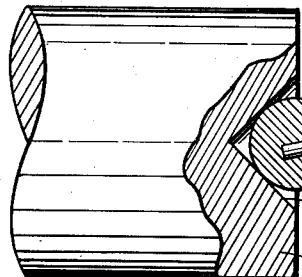
Figure 4 is a side elevation of a speed measuring instrument involving this invention.

The construction shown in Figure 4 is designed to measure the speed of rotation of a mechanical device such as a shaft. In such case, the reed 20 may be supported in a flexible diaphragm 21 carried by a protecting shell 22. The helical flattened portion of the reed extends between points 23 and 24. A finger 25 extends outwardly from the shell 22 on the side opposite to the reed 20, and carries at its end a ball 26 adapted to fit within a slightly eccentric opening 27 in the end of the shaft 28.

With such a construction, the rotation of the shaft and the resultant eccentric motion of the ball 26 will set the reed in vibration about that particular axis which corresponds in frequency to the rotational speed of the shaft 28. This axis can be determined by inspecting the angularity of the plane of vibration.

For the purpose of facilitating the reading of the angle, the end of the walls of the shell may be graduated and preferably the graduations may extend inwardly as shown at 50 over a plastic transparent cover 31.

In Figure 4 is shown the application of a weight 30 held by a set screw 31. The effect of such a weight is to slow down the vibrations of the reed and thus to change the scale range of the instrument. It will be understood that such a weight may be employed if desired to form either of the other two modifications here shown.

I have described the flattened portion of the reed as twisted through an angle of 90°, but it will be understood that it may be twisted through a greater or less angle as desired, as for example 170°. It is, however, desirable that the flattened and twisted portions shall be less than 180° in order to avoid having two hinges corresponding to two separate frequencies within the same plane of vibration.

Figure 6:
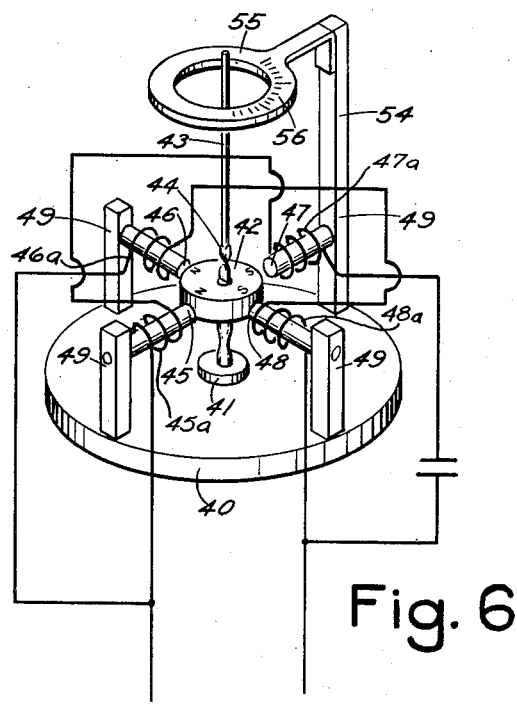
Figure 6 is a frequency meter embodying the invention.
Figure 5:
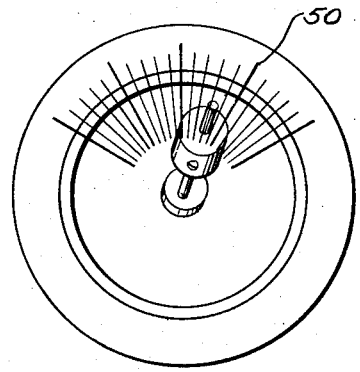
Figure 5 is an end view of the device shown in Figure 4.

In the construction shown in Figure 6, there is mounted upon a base 40 a flexible rod 41 carrying a block 42 which may take the form of a magnetically polarized disc. Mounted upon this block is a rod 43 flattened and twisted as shown at 44, similar in all respects to reed 11.

Electrical means are provided for imparting oscillatory movement to the block 42. To this end a plurality of poles 45, 46, 47, 48 are arranged about the block 42, each being energized by a coil 45a, 46a, 47a, 48a. Coils 45a—47a are in series with a condenser 56, coils 46a—48a are also in series opposition and are in multiple with coils 45a—47a and condenser 56. The current whose frequency is to be measured is imposed upon this multiple circuit.

With the above construction, there occurs a periodic impulse in every vertical plane at a frequency equal to the frequency of the current to be measured. The reed responds only to the impulse in the plane of its natural vibration at that frequency.

To facilitate reading the angle which may be made to read in terms of frequency, there is provided an upwardly extending arm 54 carrying a ring 55 concentric with the rod 43, and this ring may be provided with graduations 56.

With this construction, the frequency of the incoming current may be read directly upon the scales 56.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

We claim:

1. A vibrator comprising a base, a reed attached to said base having a flattened and twisted portion, means for imposing oscillatory energy to said base, and a scale adjacent to the free end of said reed constructed to read the angle of the plane of vibration of said reed.

2. Means for counting the frequency of a shaft or the like comprising a reed constructed and arranged to vibrate in different planes with different frequencies of vibration, a base for supporting said reed, a shell having flexible means for supporting said base and enclosing said reed, an outstanding arm, and means upon said arm for engaging and being eccentrically rotated by a rotating member, and means upon said shell for estimating the angle of the plane of vibration of said reed.

3. A device of the character described for measuring frequency comprising a base, a reed having a flattened and twisted portion extending upwardly from said base, an input circuit, and electrical means operated by said input circuit for imparting mechanical impulses symmetrically disposed about the axis of the reed to the base of the reed, and means for determining the plane of vibration of the reed.

4. A vibrating reed comprising a base portion and a vibrating portion, and a connecting portion between said base portion and said vibrating portion, said connecting portion being flattened at at least two spaced points in different planes thereby giving the reed at least two natural frequencies of vibration, and electrical means constructed and arranged to set said reed in vibration when actuated by a current having a frequency equal to the natural frequency of the reed when vibrating about one of said flattened points.

NILS OHMAN.
HAROLD J. VERITCH.

REFERENCES CITED

The following references are of record in the file of this patent:

UNITED STATES PATENTS

| Number | Name | Date |
|---|---|---|
| 602,453 | Jones | Apr. 19, 1898 |
| 834,926 | McGarvey | Nov. 6, 1906 |